(12) United States Patent
Boehm et al.

(10) Patent No.: US 8,056,425 B2
(45) Date of Patent: Nov. 15, 2011

(54) DEVICE AND METHOD FOR DETECTING A VOLUME WHILE RECEIVING AND/OR DISCHARGING A FLUID HAVING A GAS PORTION

(75) Inventors: Alfred Boehm, Viechtach (DE);
Hans-Peter Amann, Fuerth (DE)

(73) Assignee: Bartec Benke GmbH, Reinbek/Hamburg (DE)

( * ) Notice: Subject to any disclaimer, the term of this patent is extended or adjusted under 35 U.S.C. 154(b) by 99 days.

(21) Appl. No.: 12/449,898

(22) PCT Filed: Mar. 2, 2007

(86) PCT No.: PCT/EP2007/001833
§ 371 (c)(1),
(2), (4) Date: Sep. 2, 2009

(87) PCT Pub. No.: WO2008/106989
PCT Pub. Date: Sep. 12, 2008

(65) Prior Publication Data
US 2010/0089172 A1    Apr. 15, 2010

(51) Int. Cl.
*G01F 1/05* (2006.01)
(52) U.S. Cl. .................................... 73/861.79
(58) Field of Classification Search .............. 73/861.12, 73/290, 304 C, 861
See application file for complete search history.

(56) References Cited

U.S. PATENT DOCUMENTS

| 5,232,006 | A | 8/1993 | Brehmer et al. |
| 5,922,969 | A | 7/1999 | Haar |
| 6,032,539 | A | 3/2000 | Liu et al. |
| 7,038,467 | B2 * | 5/2006 | Urquidi .................. 324/635 |

FOREIGN PATENT DOCUMENTS

| DE | 3404581 A1 | 8/1985 |
| DE | 69121181 T2 | 12/1996 |
| DE | 19540884 A1 | 5/1997 |
| DE | 19733715 C1 | 9/1998 |
| DE | 10156450 A1 | 5/2003 |
| DE | 102005005295 A1 | 6/2006 |
| EP | 0341675 A2 | 11/1989 |
| EP | 0855576 A1 | 7/1998 |
| GB | 2306660 A | 5/1997 |
| WO | WO 0034767 A1 | 6/2000 |

* cited by examiner

*Primary Examiner* — Jewel V Thompson
(74) *Attorney, Agent, or Firm* — Jacobson Holman PLLC

(57) ABSTRACT

The invention relates to a device for detecting an amount while receiving and/or discharging a fluid having a gas portion comprising a measurement line for conducting the fluid, a flow measuring unit for the fluid, which is in fluid connection with the measurement line, a degree of filling measuring unit for the fluid, which is in fluid connection with the measurement line and which comprises an electrode arrangement for determining electrical properties of the fluid present in the measurement line, and an evaluation unit for determining the fluid amount conveyed which is in a signal connection with the degree of filling measuring unit and the flow measuring unit. According to the invention it is provided that the electrode arrangement of the degree of filling measuring unit has a plurality of electrode plates which form a plate stack in the region of the measurement line.

19 Claims, 6 Drawing Sheets

DEVICE AND METHOD FOR DETECTING A VOLUME WHILE RECEIVING AND/OR DISCHARGING A FLUID HAVING A GAS PORTION

CROSS-REFERENCE TO RELATED APPLICATIONS

This is a national stage of PCT/EP07/001,833 filed Mar. 2, 2007 and published in German hereby incorporated by reference.

BACKGROUND OF THE INVENTION

1. Field of the Invention

The invention relates to a device for detecting a quantity while receiving and/or discharging a fluid having a gas portion, in particular milk or fuel, having a measurement line for conducting the fluid, a flow measuring unit for the fluid, which is in fluid connection with the measurement line, a degree of filling measuring unit for the fluid, which is in fluid connection with the measurement line and which comprises an electrode arrangement for determining electrical properties of the fluid present in the measurement line, and an evaluation unit for determining the fluid amount conveyed through the measurement line and which is in a signal connection with the degree of filling measuring unit and the flow measuring unit. Such a device is designed with a measurement line for conducting through the fluid, a flow measuring unit for the fluid, which is in fluid connection with the measurement line, a degree of filling measuring unit for the fluid, which is in fluid connection with the measurement line and comprises an electrode arrangement for determining electrical properties of the fluid present in the measurement line, and an evaluation unit for determining the amount of fluid conveyed through the measurement line, which evaluation unit is in a signal connection with the degree of filling measuring unit and the flow measuring unit.

The invention further relates to a method for detecting the quantity of a fluid with a gas portion, for example milk or fuel, flowing in a measurement line, in which a degree of filling measurement is carried out in the measurement line by means of a degree of filling measuring unit, a flow measurement is carried out in the measurement line by means of a flow measuring unit, and the amount of fluid conveyed is calculated from the results of the flow measurement and those of the degree of filling measurement. It is provided in the method that a degree of filling measurement is carried out in the measurement line by means of a degree of filling measuring unit, a flow measurement is carried out in the measurement line by means of a flow measuring unit and the amount of fluid conveyed is calculated from the results of the flow measurement and those of the degree of filling measurement.

2. Description of Related Art Including Information Disclosed Under 37 CFR §§1.97 and 1.98

A generic device and a generic method are known for example from DE 10 2005 005 295 A1. This printed publication teaches the implementation of a flow measurement on the measurement and conveying line through which the fluid is conducted in order to detect the amount conveyed. In order to be able to provide exact measurement results even if there are gas pockets in the fluid, a degree of filling measurement is additionally carried out on the measurement line, that is to say the fluid content is determined in the line cross-section, whereby this content results from the overall cross-section less the gas content. The resulting measurement results are used to compensate the results of the flow measurement. A capacitance measurement or a conductibility measurement can be provided according to DE 10 2005 005 295 A1 in order to measure the degree of filling.

DE 101 56 450 A1 discloses a method and a device for determining a mass flow of milk flowing during a milking process. It is described in this printed publication that a capacitance or a characteristic value proportional thereto is determined in the measurement volume, the capacitance is compared with previously known capacitances, the speed of the milk flow is determined and a milk flow is determined from the aforementioned data.

DE 195 40 884 C2 and EP 0 855 576 A1 disclose methods and installations for measuring the volume of flowing fluids, thereby avoiding measurement errors caused by inadmissibly high gas portions. In accordance with the teaching of these printed publications, a degassing container is provided in the line system upstream of a volume meter, in which degassing container gas portions are to be separated, so that they do not influence the volume measurement. Furthermore an optical gas bubble sensor is provided. If the value measured by the gas bubble sensor exceeds an admissible value, from which a reliable gas separation may no longer be possible, a corresponding control is carried out, for example by adjusting valves, in order to modify the fluid flow until the admissible value is reached again or the actual value falls short of this admissible value. Particularly by reason of the required gas separator, however, such installations can be comparatively expensive and have a comparatively high weight and a high space requirement.

A further measuring unit for a fluid flow is known from DE 691 21 181 T2. It is provided herein that the homogeneity of the liquid is measured and for the purpose of degassing a valve is closed in the flow system if the inhomogeneity caused by the gas content exceeds a threshold value.

A further measurement method for fluids is known from DE 197 33 715 C1, in which the discharged amount is measured by means of a volume meter and the discharge is interrupted if the gas portion exceeds a certain value.

Insofar as, as known in particular from DE 10 2005 005 295 A1, gas portions are not separated and are instead tolerated in the flow measurement, detected in the measurement and used to determine the amount conveyed, undesirable interruptions in the product flow in case of gas loads can generally be avoided and a gas separator is not necessary. In comparison with measuring units with gas separators, a considerable simplification in the construction and a dramatic weight reduction are hereby achieved. Furthermore, a particularly rapid discharge is possible and also the removal of the remains from the installation is considerably simplified, as no high volume gas separator needs to be emptied. However, in particular the calibration regulations place high requirements upon the precision of the degree of filling measurement, as the results of this measurement are incorporated directly into the measurement result for the amount conveyed.

BRIEF SUMMARY OF THE INVENTION

It is the object of the invention to indicate a device and a method for detecting the volume of a fluid comprising a gas portion, which allow a particularly high measurement precision at the same time as particularly low constructive resources being required.

The object is achieved according to the invention through a device having a measurement line for conducting the fluid, a flow measuring unit for the fluid, which is in fluid connection with the measurement line, a degree of filling measuring unit for the fluid, which is in fluid connection with the measurement line and which comprises an electrode arrangement for determining electrical properties of the fluid present in the measurement line, and an evaluation unit for determining the fluid amount conveyed through the measurement line and which is in a signal connection with the degree of filling measuring unit and the flow measuring unit, wherein the electrode arrangement of the degree of filling measuring unit has a plurality of electrode plates which form a plate stack in the region of the measurement line; and a method in which a degree of filling measurement is carried out in the measurement line by means of a degree of filling measuring unit, a flow measurement is carried out in the measurement line by means of a flow measuring unit, and the amount of fluid conveyed is calculated from the results of the flow measurement and those of the degree of filling measurement, wherein the degree of filling measuring unit comprises a plurality of electrode plates which form a plate stack in the region of the measurement line.

The device according to the invention is characterised in that the electrode arrangement of the degree of filling measuring unit comprises a plurality of electrode plates which form a stack of plates, or plate stack, in the region of the measurement line.

An aspect of the invention is that gas portions in the fluid are tolerated at least up to a certain level in the flow measurement and detected by means of a degree of filling measuring unit, meaning that a gas separator is unnecessary and consequently a particularly simply constructed measuring unit is achieved. According to the invention the degree of filling measuring unit is thereby designed to measure the fluid electronically and comprises a plurality of layered electrode plates, i.e. three or more, as an electrode plate packet.

In the resulting plate stack the electrode plates are appropriately arranged so that the flat sides of adjacent electrode plates face each other. Channels are formed between the electrode plates, through which channels the fluid can flow. Through the stacked arrangement of a plurality of electrode plates, a short electrode distance and a particularly homogeneous field pattern can be achieved in a simple way. The short electrode distance and in particular the associated comparatively large capacity allow a particularly high sensitivity of the degree of filling measuring unit. The homogeneous field distribution can ensure that gas pockets of a certain size provide at least approximately the same measurement signal over the whole cross-section of the measurement line, edge effects are thus avoided and a particularly high measurement precision is achieved in the degree of filling measurement. The invention thereby allows good measurement precision both with high and low degrees of filling, thus both with a low content of undissolved gas and with a high content of undissolved gas. At the same time the design of the degree of filling measuring unit with a plate stack allows large measurement line cross-sections to be provided with low equipment resources. A low flow resistance and thus high throughput rates can hereby be achieved for the liquid flowing through.

The invention additionally ensures a particularly high level of protection against tampering. All elements necessary for detecting the amount, in particular the flow measuring unit and the degree of filling measuring unit, can be in a simple and clear manner arranged on a measurement tube so that a tampering can be immediately visually spotted. In comparison with previously known installations with gas separators, the device according to the invention is additionally considerably more compact and thus also more clearly laid out.

The degree of filling is understood to mean in particular the fluid content in the line. The degree of filling can thus constitute a measurement for the part of the line cross-section in which fluid and no undissolved gas is present. When fluids are at rest the degree of filling results from the fill level, thus the height of the fill level interface. In case of flowing fluids, gas pockets may also be present in the bottom region of the measurement line such that the degree of filling can be correspondingly reduced.

In order to convey the fluid through the measurement line, a pumping device can be arranged on said measurement line. However, the fluid can also be conveyed solely through the effect of gravity.

In order to achieve a particularly precise degree of filling measurement, it is useful according to the invention that at least one of the electrode plates of the plate stack is arranged inside the measurement line. However, in particular the two outermost electrode plates, which are at the top and bottom end of the plate stack, can also be arranged outside of the measurement line or in the wall of the measurement line.

A particularly even field distribution and thus a particularly high measurement precision as well as measurement results facilitating particularly simple interpretation can be obtained according to the invention in that at least two, preferably all, electrode plates of the plate stack extend parallel to each other, in that the electrode plates of the plate stack are arranged equidistantly, in that the electrode plates of the plate stack have at least approximately the same surface size and/or in that the electrode plates of the plate stack are flat rectangular plates. In particular in order to take into account the boundary conditions, it can also be provided according to the invention that the outermost electrode plates of the plate stack, which form the ends of the plate stack, differ in form, size, thickness or in other properties from the remaining electrode plates of the plate stack.

Apart from flat plates, in particular rectangular plates, it is also possible in principle according to the invention for cylindrical plates to be available which are appropriately coaxially arranged so that in particular a multi-layer cylindrical capacitor is produced. In this case it can be provided that the distances of adjacent electrode plates in the plate stack are not equidistant but are instead provided so that the same capacitance is constantly given between each adjacent pair of electrodes. In order to guarantee that gas pockets generate at least approximately the same measurement signal irrespectively of their position in the cross-section of the measurement line, it is advantageous in the case of a cylindrical plate arrangement to use a number of electrode plates that is as great as possible.

For a particularly low flow resistance and thus high conveyance rates with low required resources, it is advantageous that the electrode plates extend in the longitudinal direction of the measurement line and/or that through channels for the fluid are formed between the electrode plates, which through channels extend in the longitudinal direction of the measurement line. In this embodiment the degree of filling measuring unit, which can also be described as a gas bubble sensor, can simultaneously serve as a flow straightener for the fluid flow. This is particularly advantageous having regard to the measurement precision if the degree of filling measuring unit is arranged upstream of the flow measuring unit.

Having regard to the measurement precision, it is further particularly advantageous that the outer cross-section of the plate stack corresponds at least approximately to the preferably rectangular inner cross-section of the measurement line. Gas pockets can hereby be detected over the whole flow cross-section. For a particularly simple construction with homogeneous field distribution, the plate stack and the inside of the line are appropriately formed with a rectangular cross-section. It can in principle also be provided that the plate stack is formed with a smaller cross-section than the measurement line, whereby the degree of filling determined within the plate stack can then be extrapolated to the overall inner cross-section of the measurement line. This can be provided in particular if an even distribution of the gas pockets over the cross-section of the measurement line is to be expected.

The required measurement resources can be further reduced in that the electrode plates of the plate stack are electrically connected to form two groups of plates which preferably form an interdigitated structure. In particular the electrode plates following on each other in the plate stack can be electrically connected to each other in an alternating way in order to form the interdigitated structure with finger-like engagement. The electrical connection is appropriately produced with particularly limited required resources within the measurement line. For example, for the purpose of connection, connection plates extending transversely to the electrode plates can be provided, on each of which an electrical line to the evaluation unit is arranged.

The degree of filling measuring unit is preferably a capacitive measuring unit. In such a capacitive measuring unit the electrode plates are usefully subjected to a voltage which varies over time. The idea behind a capacitive measurement is that gas pockets generally have a different relative permittivity from the fluid and the relative permittivity of the medium present between the plates thus changes with the gas portion. For the purpose of degree of filling determination, the capacitance between the electrode plates or a correlated measurement value, for example the relative permittivity, is detected and brought into a correlation with the degree of filling through appropriate methods.

Particularly when using a capacitive degree of filling measuring unit, the device according to the invention is particularly suitable for measuring non-conductive fluids such as heating oil, diesel and other fuels.

In order to increase the measurement precision, it can be advantageous particularly with capacitive measurements for the electrode plates to be electrically insulated in relation to the inside of the measurement line. The conductive electrode plates are suitably formed with coatings, whereby for example undesirable absorption effects can be avoided.

A particularly simple device is produced in that the flow measuring unit is a mechanical flow sensor. The flow measuring unit can for example be designed to measure the volume flow and/or the mass flow. The flow measuring unit is preferably a turbine flow meter. A turbine flow meter comprises a measurement turbine, which is set in rotation through the flowing fluid. The rotational movement of the measurement turbine can be detected without contact via a sensor, for example a magnetic sensor, which preferably has at least two sensor elements which are phase shifted by 90°. The number of pulses determined by the sensor is a measure for the speed and this in turn is a measure for the current flow. According to the invention the turbine flow meter can also comprise three or more pulse sensor elements, whereby the measurement reliability can be increased, as errors occurring under certain circumstances can be better detected and corrected as necessary. By means of a turbine flow meter, a very high measurement precision of for example less than ±0.3% of the measurement value can be obtained, whereby the precision generally depends upon the viscosity and hence the composition and temperature of the product, but also upon the flow speed and the pressure. In addition a turbine flow meter enables the measurement line to be formed in a straight line in the region of the flow measuring unit and thus the arrangement of the inlet opening and the outlet opening of the flow measuring unit so that they are aligned. This can go hand in hand with considerable structural simplification.

A tank is usefully provided according to the invention, on which the measurement line is arranged, particularly in a fixed manner. In particular the measurement installation can be provided on a tanker, for example on a heating oil vehicle.

For a particularly good flow pattern and a particularly compact structure, which is particularly suitable in particular for tankers, it is advantageous that the measurement line is formed in a straight line, particularly in the region of the flow measuring unit and the degree of filling measuring unit. At least the measurement line region between these two measuring units is preferably formed in a straight line. Through the design in a straight line, undesirable swirls can also be prevented, as these could impair the measurement precision.

It is further advantageous that the measurement line extends at an angle to the horizontal, particularly in the region of the flow measuring unit and/or the degree of filling measuring unit, whereby the height of the measurement line preferably decreases with increasing distance from the tank. An automatic vent function can hereby be achieved, in which gas bubbles collecting in particular upon filling the system automatically move upwards away from the measuring units, for example towards a degassing opening. The angle to the horizontal can for example be approximately 30°.

In order to increase protection against tampering with regard to deliberately added gas, it is useful that the flow measuring unit and the degree of filling measuring unit are arranged directly one behind the other in the course of the measurement line. This is particularly advantageous if the degree of filling measuring unit is arranged in the flow system upstream of the flow measuring unit, thus in the line system closer to the discharge tank. In that way, the degree of filling measuring unit according to the invention detects not only unintentionally mixed-in gas portions but also portions mixed in knowingly for tampering purposes. Tampering with the measurement in the case of the degree of filling measuring unit being arranged upstream is thus only possible if gas is introduced in the region between the degree of filling measuring unit and the flow measuring unit, because it is only in this case that the gas is counted by the flow measuring unit and the erroneous measurement is not compensated by the degree of filling measuring unit. If gas is added downstream of the two measuring units, this does not influence the determined measurement values, as the gas does not reach the measuring units. If gas is added upstream of the two measuring units, this may indeed be measured in the flow measurement, but it is also detected by the degree of filling measuring unit and thus taken into consideration in the fluid amount calculation. By arranging the two measuring units directly one behind the other, the line region allowing tampering is reduced in size, so that tampering is made considerably more difficult. In particular this region can be clearly marked on the part of the calibration authorities so that a verification is possible at any time. In order to further increase protection against manipulation, it can be provided that the flow measuring unit and the degree of filling measuring unit form a functional unit.

Protection against tampering can be further increased in that the degree of filling measuring unit is arranged downstream of the flow measuring unit, so that the flow measuring unit is arranged closer to the discharge tank than the degree of filling measuring unit. In this case, tampering through the introduction of gas is only possible if the gas is introduced upstream of the flow measuring unit, but if the gas is also removed from the line again downstream of the flow measuring unit before reaching the degree of filling measuring unit. It is only in this case that the gas would indeed be detected in the flow measurement but not in the subsequent degree of filling measurement and thus the corresponding gas portion would not be compensated in the flow amount determination. Removal of gas from the line is, however, only possible with a very large amount of equipment, which would generally be easily recognisable.

It is possible according to the invention for the degree of filling measuring unit to be arranged upstream of the flow measuring unit, i.e. closer to the discharge tank. However, a reverse arrangement is also possible, in which the flow measuring unit is arranged upstream of the degree of filling measuring unit. The degree of filling measuring unit and the flow measuring unit can thus be arranged in an interchangeable way.

It is further particularly preferred according to the invention that a control unit is provided, with which the flow through the measurement line can be controlled in dependence upon the measured degree of filling. The idea behind this embodiment is that the measurement precision of the degree of filling measuring unit and/or flow measuring unit can be degree of filing—dependent in certain conditions and in particular can decrease with low degrees of filling, i.e. high gas portions. The control unit allows the flow to be reduced with an increasing gas portion, for example at the end of the discharge with a low fill level in the tank. In case of a reduced flow speed, the risk of gas pockets being taken along is reduced, meaning that the degree of filling can increase again. It can be provided in particular that the control unit only influences the flow through the measurement line if the gas portion exceeds a certain threshold value. The control unit can reduce the flow for example continuously or in stages or also totally interrupt it. If a pump device is provided, the control unit for controlling the flow through the measurement line can be in a signal connection with this pump device and be designed to influence the pump power. In order to control the flow, however, a corresponding valve can also be provided on the line, with which the control unit is in a line connection.

Particularly having regard to the measurement precision, it can be advantageous to reduce large gas bubbles before reaching the flow measuring unit and/or the degree of filling measuring unit. A particularly preferred embodiment of the invention thus consists in that a reducing unit, i.e. a breakup unit, in particular a sieve and/or filter, is provided in the measurement line in order to reduce the dimensions of gas pockets in the fluid before reaching the degree of filling measuring unit and/or the flow measuring unit. The degree of filling measuring unit can also act as a reducing unit itself with its plate stack. By means of a sieve and/or filter, undesirable particles can at the same time be prevented from penetrating the measurement section.

The method according to the invention is characterised in that the degree of filling measuring unit comprises a plurality of electrode plates, which form a plate stack in the region of the measurement line. The method according to the invention can be implemented in particular with a device according to the invention, whereby the advantages set out in this connection can be achieved.

Particularly having regard to the measurement precision, it is advantageous that the temperature, the pressure and/or the speed of the fluid are determined in the measurement line and the results are included in the calculation of the amount of fluid conveyed. A temperature determination allows a temperature compensation (TMU) to be carried out and a reference to the characteristic viscosity curve to be established. When the product is known, the temperature, the pressure and/or the speed can be entered into a calculation with stored tables and/or correction algorithms. The current measurement value for the flow and/or the degree of filling can be continuously corrected with the corresponding results.

It is frequently desirable, for example in the case of discharge of heating oil by means of a tanker, not to empty the discharge tank all at once but instead to distribute the product contained in the discharge tank over a plurality of receiving points. In particular it can be provided for this that the fluid flow is stopped in the measurement line at least from time to time. The device for detecting the volume can, preferably together with the tank, then be brought to another discharge location and the discharge can be recommenced. In order to stop the flow, corresponding check valves can be arranged in the line system.

In the case of known measurement installations with gas separators, it is usually ensured that the line system is filled in the region of the discharge opening, in particular in full hoses provided there, with a product without gas pockets. According to the invention, on the other hand, gas pockets are admissible. In order to ensure that the next customer does not pay for gas pockets but only for the product received, it is desirable to know whether gas pockets are present in the discharge-side region of the line system, in particular in the full hose.

Insofar as the fluid flow is stopped at times, it is thus advantageous that a remaining fluid amount present in the measurement line downstream of the flow measuring unit and/or the degree of filling measuring unit is determined from the results of the flow measurement and/or the results of the degree of filling measurement. This embodiment takes into consideration that a significant length of measurement line can be present downstream of the measuring units, in which length of measurement line product including possibly present air pockets remains after the end of the discharge. The amount of this remaining product is determined as a remaining fluid amount value, whereby possibly present gas pockets are taken into consideration in the determination of the remaining fluid amount.

A so-called full hose can for example be provided downstream of the measuring units, that is to say a hose which remains full as the tanker travels from one discharge point to the next and which can comprise a valve in the region of its end-side discharge opening for maintaining the full status. Also in the case of the product discharge being ended after air pockets have indeed passed the measuring units, but these air pockets have not yet arrived in the destination tank and are instead still present in the full hose, said preferred embodiment allows the product volume present in the full hose downstream of the measuring units to be correctly determined. The correct product volume can thus be allocated to the next customer.

The determination of the remaining fluid amount present in the measurement line downstream of the measuring units can be carried out with the known line length in particular through integration of the measurement values of the measuring units. It is possible in particular for the flow speed of the fluid in the measurement line and the degree of filling to be included in the calculation of the remaining fluid amount. The remaining fluid amount determined is preferably stored in a non-volatile memory at least until the fluid flow is resumed. The invention thus allows the gas pockets present downstream of the measuring units to be pursued across various discharge stations.

Particularly having regard to a particularly high precision in the determination of the discharged fluid amount, it is advantageous that the determined remaining fluid amount is deducted from the determined fluid amount and/or that the determined remaining fluid amount is added at least in parts to the fluid amount determined after the fluid flow is resumed. If, after resumption of the flow, the volume present downstream of the measuring unit is only partially replaced, if therefore only a small amount of fluid is discharged, it can also be provided that the determined remaining fluid amount is only considered in parts after the resumption of the flow.

If gas pockets arise in the fluid conveyance, the gas-loaded product flow can push the unloaded flow in front of it under appropriate conditions in the sense of a liquid column without demixing taking place. It can thus be provided for a particularly high measurement precision that the remaining fluid amount is determined in dependence upon location. This embodiment includes that the gas pockets are detected downstream of the measuring unit in dependence upon their position in the line system and stored. This permits a particularly precise determination of the amount even in case of small amounts of fluid being discharged.

Under certain conditions, it can happen that not only the degree of filling changes which are to be established lead to a change in the measurement signal of the degree of filing measuring unit, but also changes of other product properties, for example the product composition and/or the product temperature. If for example a capacitive degree of filling measurement is carried out, a change in the chemical fluid composition can lead to a change in the relative permittivity, which is established by the degree of filling measuring unit. In order to avoid such changes being wrongly interpreted as changes in the degree of filling, it is advantageous according to the invention that the degree of filling measuring unit is recalibrated, particularly with ongoing degree of filling measurement.

A constant updating of the calibration of the degree of filling measuring unit is appropriately carried out on the basis of the previously measured degrees of filling and/or using plausibility criteria. It can be provided for example that slow changes in the measurement values are attributed to the product and these changes are thus used for recalibration of the degree of filling measuring unit and not included in the amount determination. In particular, those changes containing an increase in the relative permittivity can also remain out of consideration in the determination of the amount and be used for recalibration, as gas pockets in fluids, particularly hydrocarbons, generally bring with them a reduction in the relative permittivity. Quicker changes in the measurement values, in particular those changes which contain a reduction in the relative permittivity, can on the other hand be assigned to gas pockets and be taken into consideration in the determination of the amount of fluid.

The method according to the invention and the device according to the invention can advantageously contain one or more features of the disclosure of the published German patent application DE 10 2005 005 295 A1. DE 10 2005 005 295 A1 is incorporated in its entire contents into the subject matter of the present patent application. In particular the remaining amount determination, the recalibration and the angular arrangement of the measurement line can be regarded as independent aspects of the invention which can also be achieved without a degree of filling measuring unit with electrode plates and/or a plate stack.

BRIEF DESCRIPTION OF THE SEVERAL VIEWS OF THE DRAWINGS

The invention is described in greater detail below by reference to preferred embodiments which are shown schematically in the figures, in which:

FIG. 8 the degree of filling measuring unit of FIGS. 6 and 7 in a partially sectional view.

DETAILED DESCRIPTION OF THE INVENTION

Figure 1:
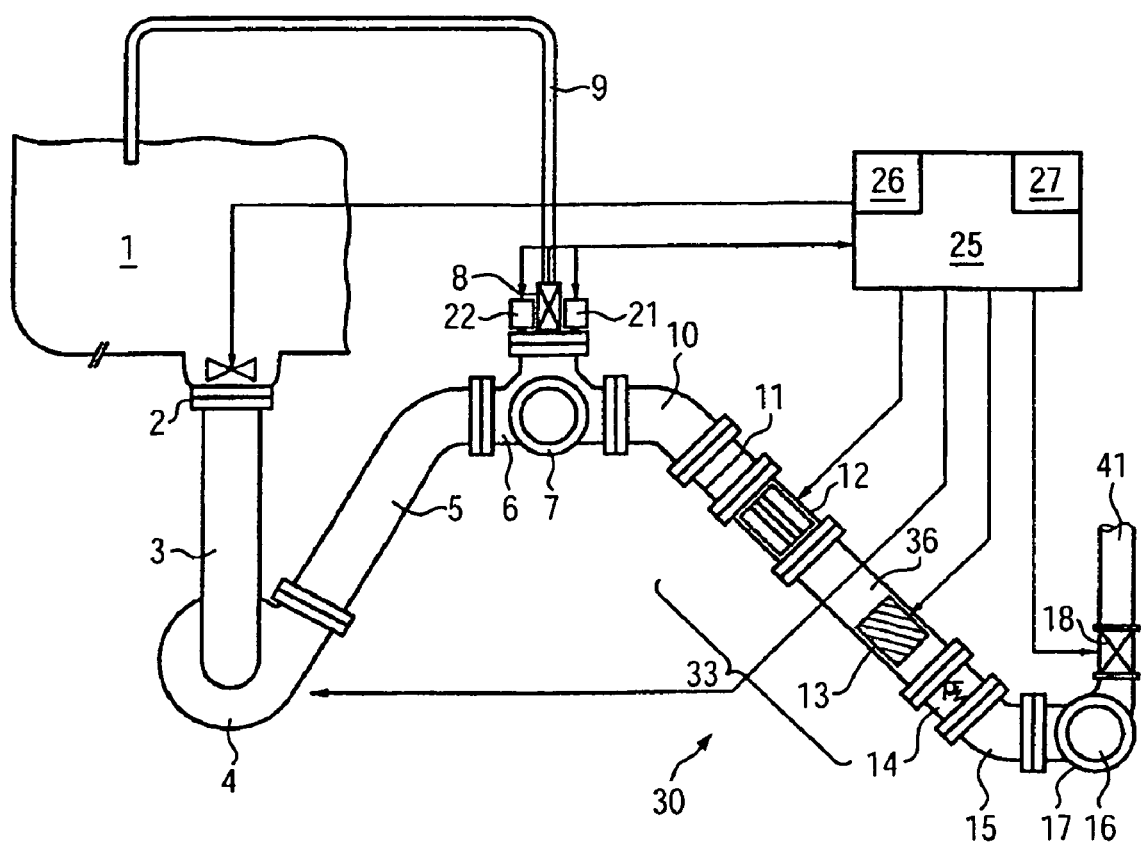
FIG. 1 shows a first embodiment of a device according to the invention for implementation of the method according to the invention, wherein the discharge region of the measurement line is not shown in detail.

Elements having the same effect are characterised by the same reference numerals throughout the drawings.

Figure 2:
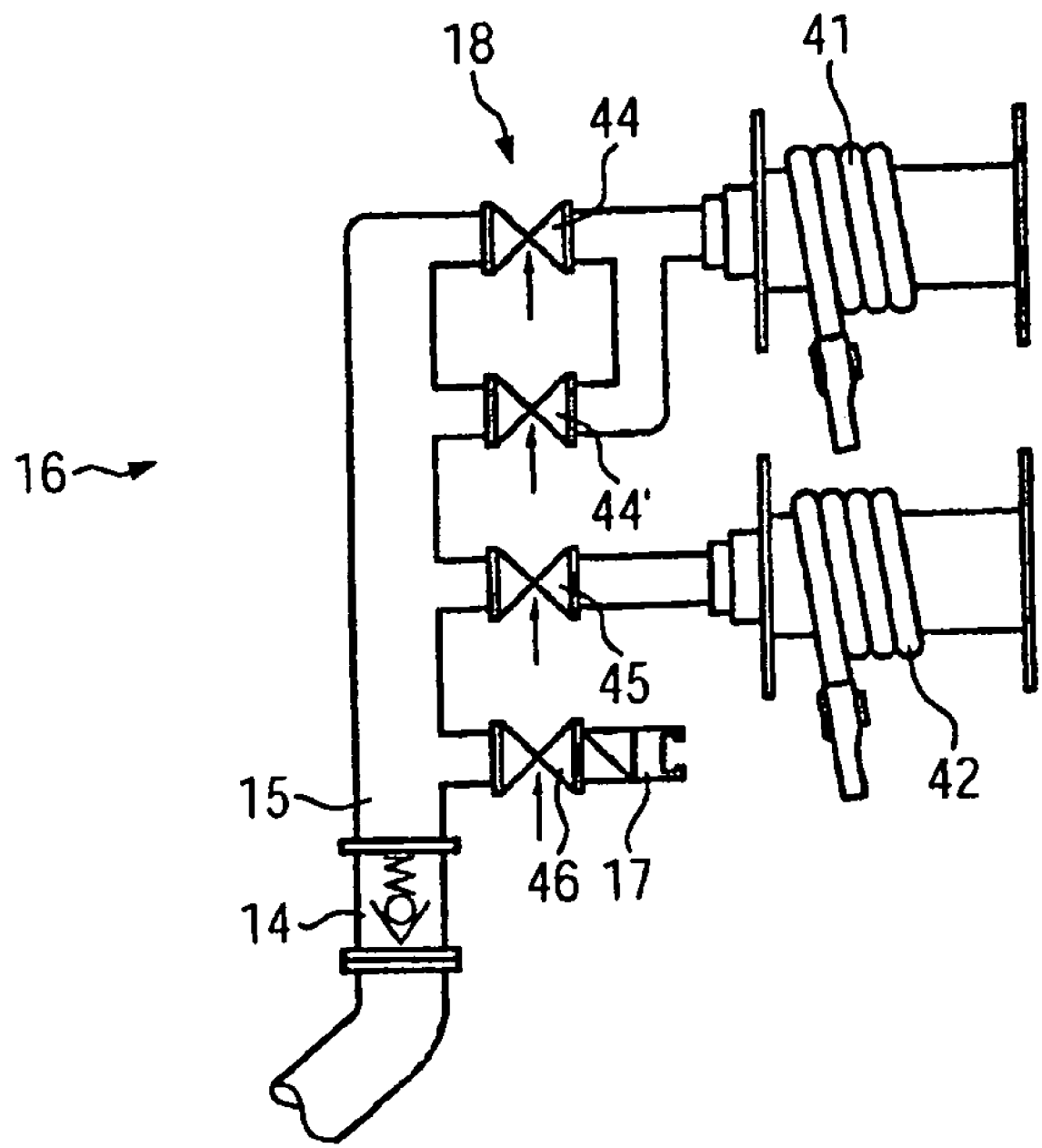
FIG. 2 the discharge region of the device of FIG. 1.

A first embodiment of a device according to the invention is shown in FIGS. 1 and 2, whereby FIG. 2 shows the discharge region of the device.

The device comprises a tank 1 in which the fluid to be discharged and of which the amount/volume is to be determined is received. This tank 1 can for example be arranged on a tanker vehicle. On the bottom of the tank 1 a bottom valve 2 is provided. A pipeline 3 connects to this bottom valve 2, said pipeline 3 leading to a pump 4. The pump 4 is arranged at the lowest point of the line system of the device. An ascending pipeline 5 leads from the pump 4 to a distributor 6, the structure of which is described in detail below. A further pipeline 10 connects to the distributor 6 and leads to a measurement section 33.

On the input side, i.e. on the side of the measurement section 33 facing the tank 1, a filter 11 formed as a sieve is provided, which can also serve in particular for the breakup of the gas portions. A degree of filling measuring unit 12 connects to the filter 11 in the measurement section 33, said degree of filling measuring unit simultaneously acting as a flow straightener. A flow measuring unit 13 formed as a measurement turbine connects in turn to said degree of filling measuring unit 12 in the measurement section 33. A settling section 36 can usefully be provided upstream of the flow measuring unit 13, i.e. on the side facing the tank 1, between the flow measuring unit 13 and the degree of filling measuring unit 12.

A check valve 14 connects directly in the line system to the flow measuring unit 13, that is to say without a fairly long settling section. Said check valve 14 allows a flow directed from the tank 1 and can hereby produce a counter pressure, which can work against the tendency of the fluid to take gas portions along with it. A pipeline 15 connects to the check valve 14 and a second distributor 16, which is shown in detail in FIG. 2, connects in turn to said pipeline 15. The pipelines 10 and 15 form, together with the measurement section 33, a measurement line 30.

As shown in FIG. 2, two full hoses 41, 42 are arranged on the distributor 16, which each have a valve in the region of their respective outlet openings. Furthermore a coupling 17 for an empty hose is provided on the distributor 16. The individual hoses are connected via valves 44, 44', 45, 46 of a valve arrangement 18 to the second distributor 16. Two valves 44, 44' are provided between the first full hose 41 and the distributor 16, whereby the second valve 44' is arranged in a bypass line. A single valve 45 is arranged between the second full hose 42 and the distributor 16. A valve 46 is provided between the coupling 17 for the empty hose and the distributor 16. The discharge via the empty hose to be coupled to the coupling 17 and/or the full hoses 41, 42 can be realised for example in pump operation or in gravity operation.

Figure 3:
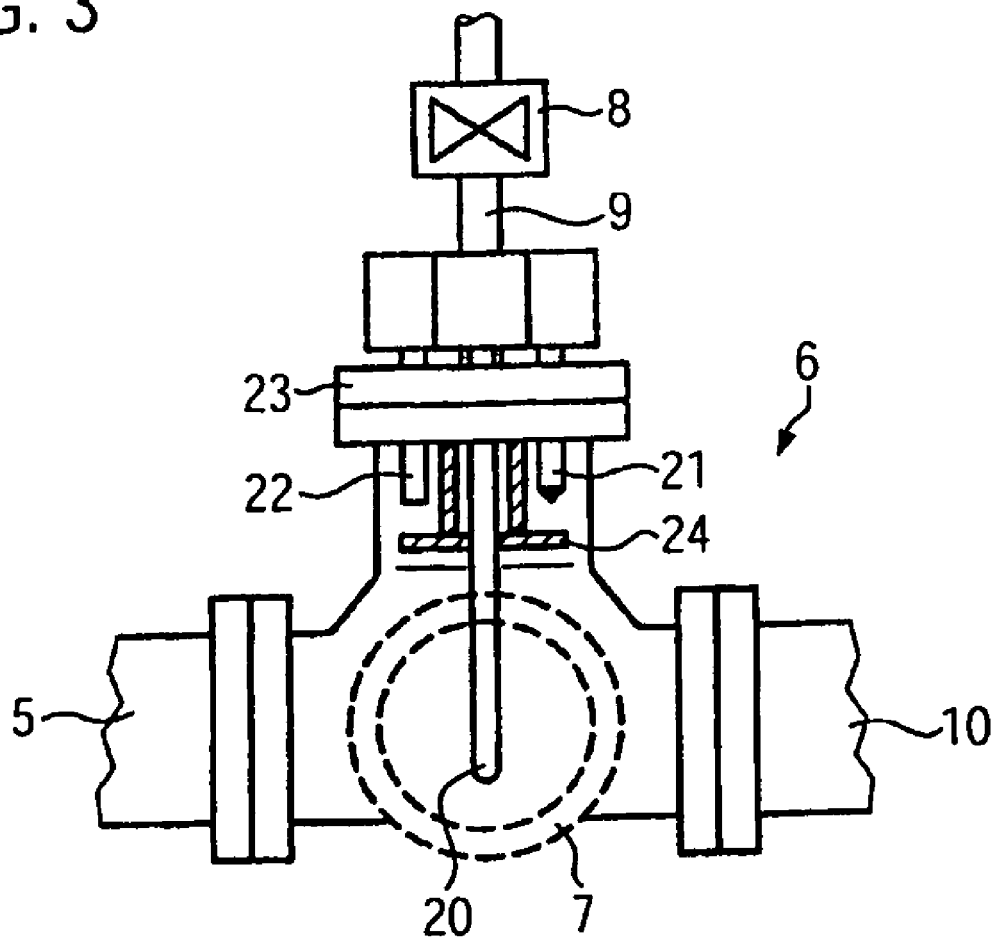
FIGS. 3 and 4 detailed views of the distributor of the device of FIG. 1.
Figure 4:
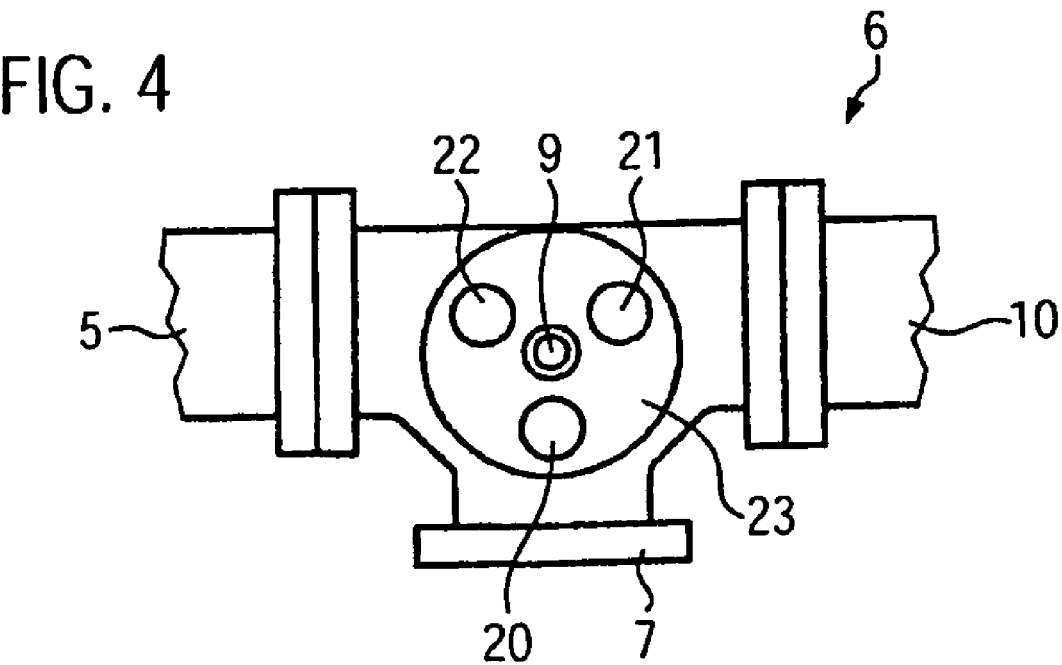

The distributor 6 arranged upstream of the measurement section 33 is shown in detail in FIGS. 3 and 4, whereby FIG. 3 shows a side view and FIG. 4 a top view. Besides connections for the two pipelines 5 and 10, a coupling 7 for an empty hose is provided on the distributor 6, via which empty hose fluid can be discharged without being measured, for example for the purpose of removal of the remains from the tank 1. In an upper region of the distributor 6, a vent line 9 branches out from said distributor 6 and leads back into the inside of the tank 1. A vent valve 8 is arranged on this ventilation line 9. The ventilation line 9 facilitates venting of the measurement line 30 during filling.

In addition a temperature sensor 20, a wetting sensor 21 and a pressure sensor 22 for the fluid flowing in the measurement line 30 are provided on a covering assembly plate 23 of the distributor 6. Furthermore, an approximately horizontally extending baffle plate 24 is provided, which protects the sensors 21, 22 arranged in a side arm of the distributor 6 from direct influence of the main flow flowing through the lines 5 and 10.

As shown in FIG. 1, the device additionally comprises a controller 25 formed as an electronic computer. This controller 25 is in a signal connection with the degree of filling measuring unit 12 and the flow measuring unit 13 and comprises an evaluation unit 26, which determines the conveyed fluid amount from the measurement values of the measuring units 12 and 13 and outputs it. The controller 25 is additionally in a signal connection with the sensors 20 to 22, whereby in particular the signals of the temperature sensor 20 and of the pressure sensor 22 are included in the output result for the amount of fluid conveyed.

The controller 25 is additionally in signal connection with the bottom valve 2, the vent valve 8, the discharge-side valve arrangement 18 and the pump 4 and comprises a control unit 27 for controlling these elements.

Figure 5:
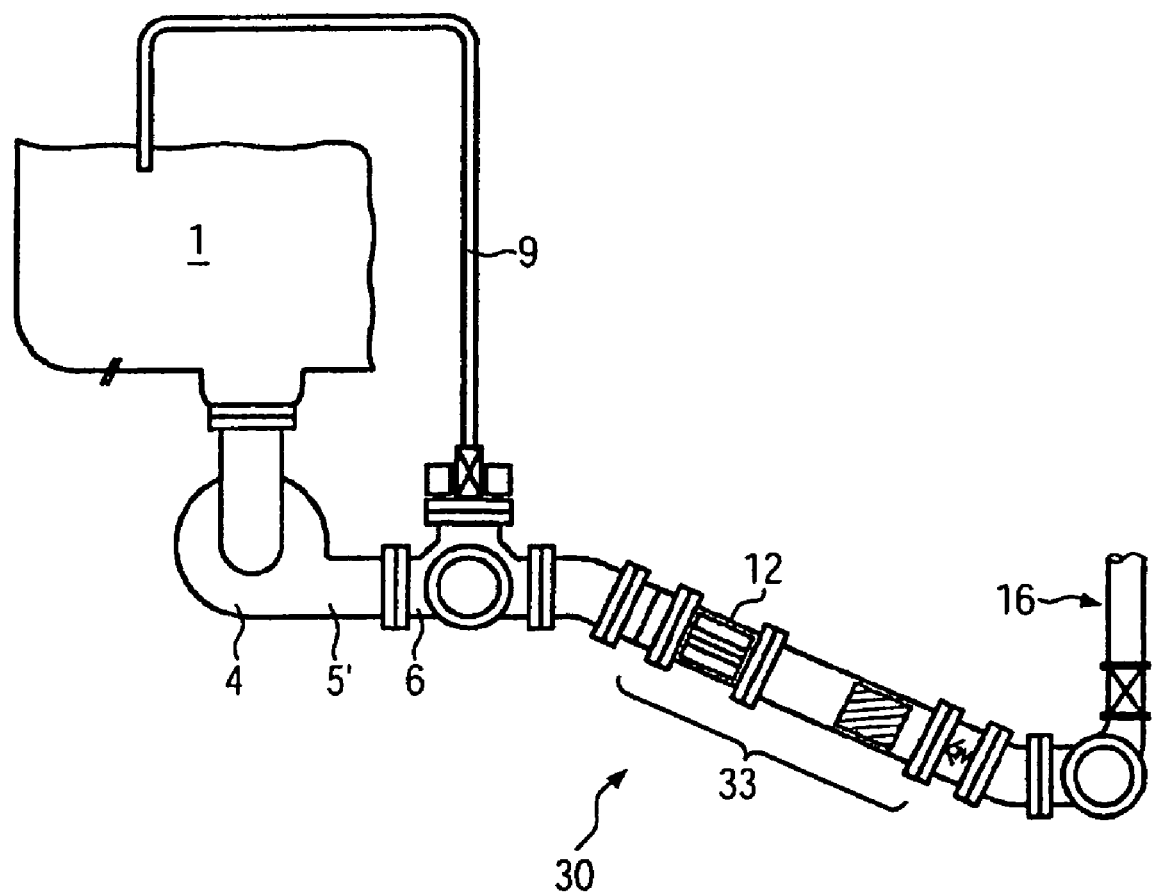
FIG. 5 a further embodiment of a device according to the invention for implementing the method according to the invention, wherein the discharge region is not shown here in detail, too.

A further embodiment of a device according to the invention for implementing the method according to the invention is shown in FIG. 5. The device of FIG. 5 differs from the device of FIG. 1 in that in the embodiment of FIG. 5 the pump 4 is upwardly offset and a horizontal pump outlet is provided. Accordingly, the pipeline 5' extends between the pump 4 and the distributor 6 according to FIG. 5 at least approximately horizontally. The distributors 6 and/or 16 of the embodiment of FIG. 5 can be designed as shown in FIGS. 2 to 4.

Both in the embodiment of FIG. 1 and that of FIG. 5, the measurement line 30, in particular its measurement section 33, is inclined in relation to the horizontal, whereby the line height decreases with increasing distance from the distributor 6 and thus from the vent line 9. An automatic venting function is hereby produced, wherein gas bubbles collecting in the measurement section 33, particularly upon filling the system, automatically move upwards towards the vent line 9 branching on the distributor. In the embodiment of FIG. 1, the line height decreases on both sides of the distributor 6 with increasing distance from the distributor 6 and thus from the vent line 9, so that a particularly effective automatic venting is produced over a large line region.

Figure 6:
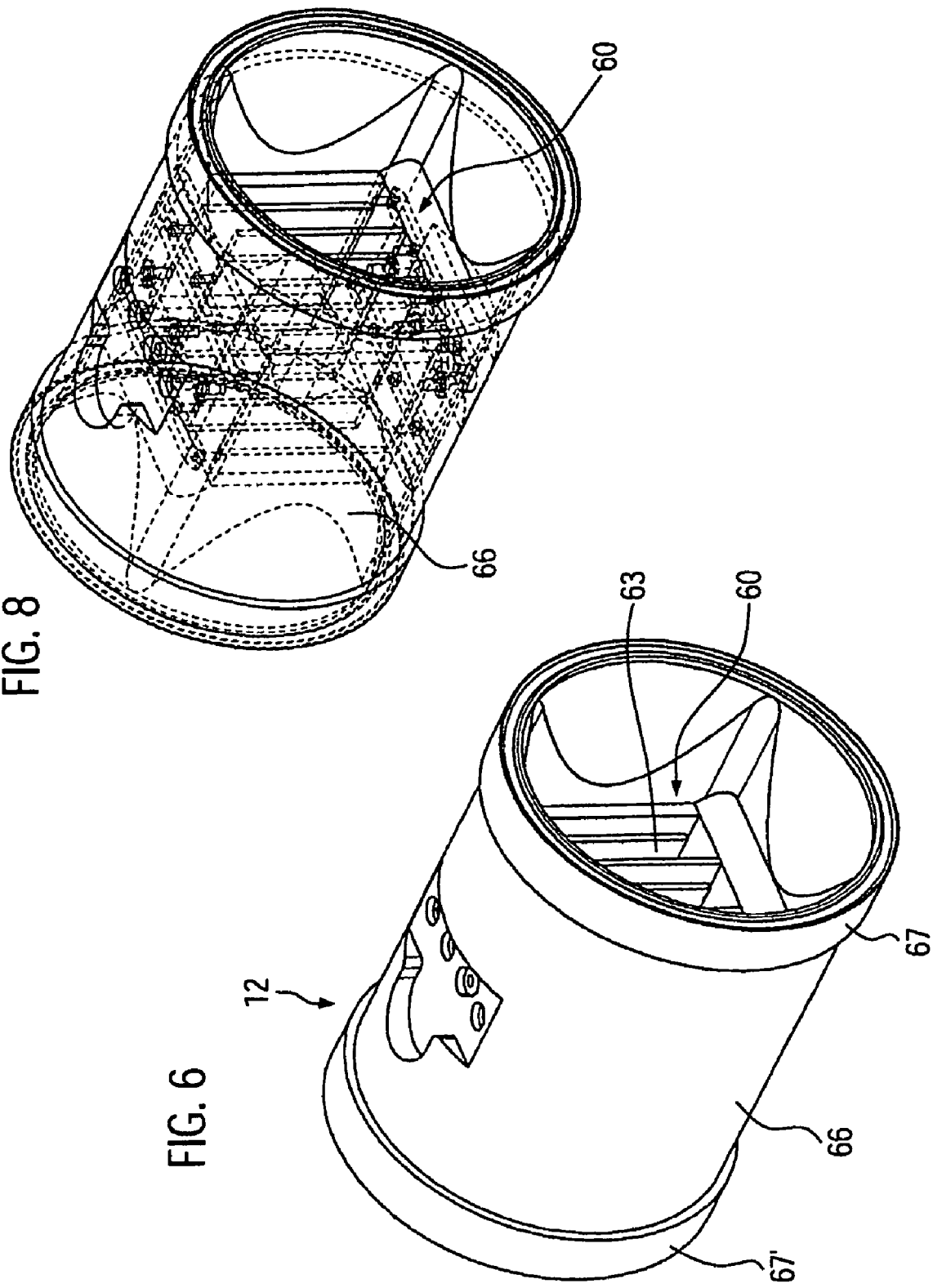
FIG. 6 a perspective view of a degree of filling measuring unit for use in one of the devices according to FIG. 1 or 5.
Figure 7:
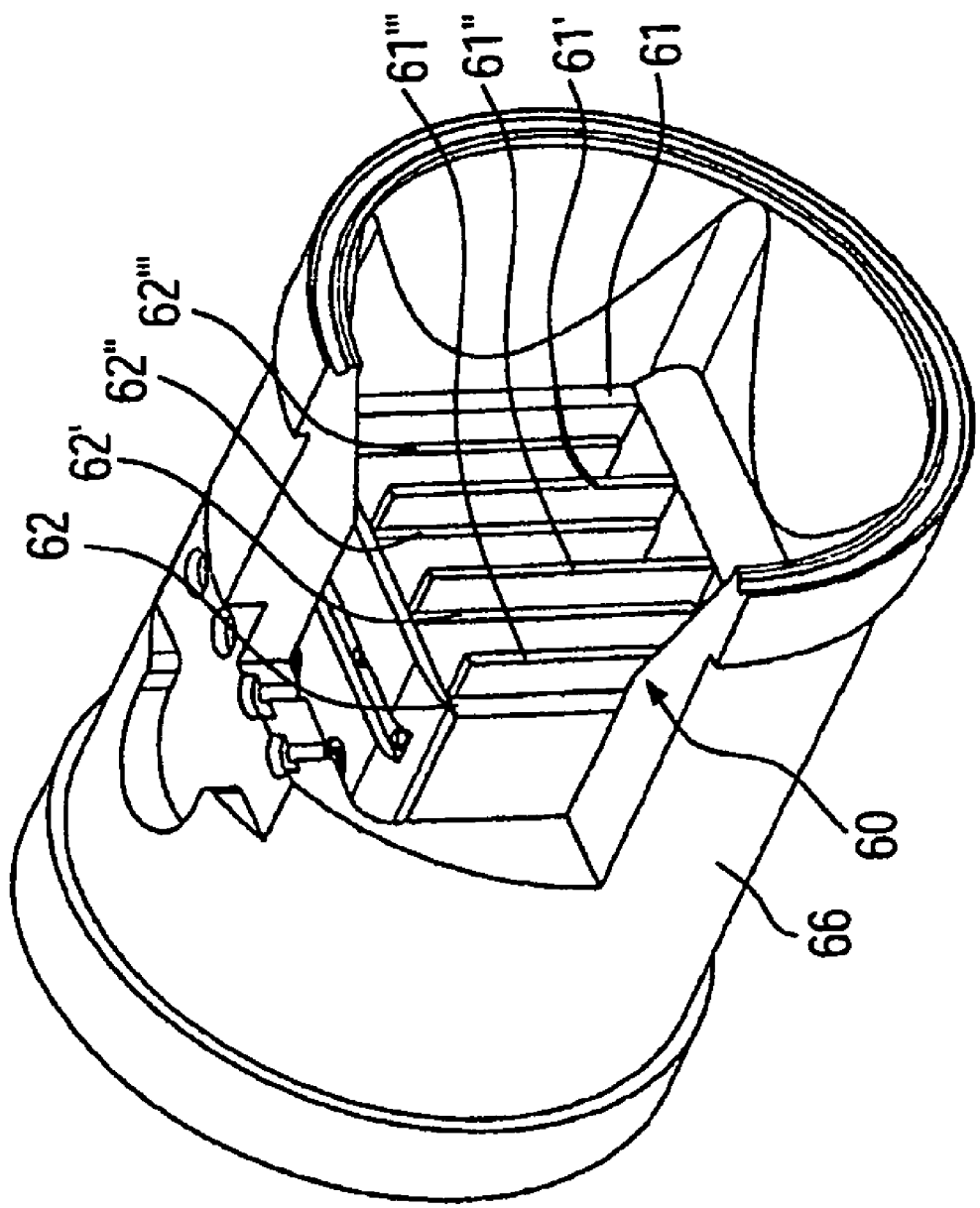
FIG. 7 the degree of filling measuring unit of FIG. 6, wherein the concealed edges are shown in broken lines.

The degree of filling measuring unit 12 of the embodiments of FIGS. 1 to 5 is described in detail in FIGS. 6 to 8. As can be seen from FIGS. 6 to 8, the degree of filling measuring unit 12 comprises a tubular housing 66, on the end faces of which two annular connection regions 67, 67' are provided for incorporation of the degree of filling measuring unit 12 into the measurement line system. While the housing 66 in the region of the connection regions 67, 67' is formed with an approximately circular inner cross-section, the inner cross-section tapers towards the middle of the tubular housing 66 and is formed there with a rectangular inner cross-section. In the region of the rectangular inner cross-section, an electrode plate stack 60 is provided, which completely fills the inner cross-section.

As can be seen in particular from FIG. 7, the electrode plate stack 60 comprises a plurality of electrode plates 61 to 61''' and 62 to 62''', which are formed as conductive capacitor plates with an insulating coating. These electrode plates 61 to 61''', 62 to 62''' are formed as rectangular plates, arranged parallel to each other and extend in the longitudinal direction of the tubular housing 66.

The electrode plates 61 to 61''' are electrically connected to each other and form a first plate group. Likewise, the electrode plates 62 to 62''' are electrically connected to each other and form a second plate group. The electrode plates of the two groups are arranged alternately, so that an electrode plate 61 of the first plate group is followed by an electrode plate 62''' of the second plate group and this is in turn followed by an electrode plate 61' of the first plate group, etc. The electrode plates 61 to 61''' of the first plate group thus form, together with the electrode plates 62 to 62''' of the second plate group, an interdigitated structure, in which the electrodes of the two plate groups engage in each other in the manner of fingers. Adjacent electrode plates 61, 62 are thereby arranged equidistantly. As shown by way of example in FIG. 6, a plurality of through channels 63 with an approximately rectangular cross-section are formed between the electrode plates 61 and 62, said through channels 63 allowing fluid to flow through the degree of filling measuring units 12. Through the electrode plates 61, 62 a layered plate capacitor is provided which allows a particularly precise determination of the relative permittivity $\epsilon_r$ and thus of the degree of filling in the cross-section of the degree of filling measuring unit 12.

The measuring units shown in the figures can be operated as follows in a method according to the invention:

Generally, the whole line system including the measurement section 33 and the degree of filling measuring unit 12 are filled with product, for example heating oil, at the start of the product discharge. At the start of the discharge a selection is made as to where the product is to be discharged. This can be carried out unmeasured via an empty hose on the coupling 7 or measured via an empty hose on the coupling 17. The discharge can, however, also be carried out in a measured way via the full hoses 41 and 42.

For the purpose of discharge for example via the full hose 42, the associated valve 45 of the valve arrangement 18 is opened. Furthermore, the bottom valve 2 is opened and the pump 4 is started. The distributor 6 is thereby filled with product at least as far as the wetting sensor 21 formed as an "empty"-reporting sensor and which can also be called a coverage sensor. The pressure in the discharge system is determined via the pressure sensor 22. The temperature sensor 20 measures the product temperature, so that a temperature compensation can be carried out.

The fluid coming from the tank 1 and the pump 4 is pushed through the filter 11, which may keep particles which have been carried along away from the measuring units 12, 13 and reduces large gas bubbles. From the filter 11, the fluid reaches the degree of filling measuring unit 12, which works according to the capacitive principle with a homogeneous field distribution. If this degree of filling measuring unit 12 is completely filled with a hydrocarbon-based fuel, it detects a relative permittivity $\epsilon_r$ of approximately 3. Flowing of a gas bubble into the degree of filling measuring unit causes a change in the relative permittivity $\epsilon_r$ between the electrode plates 61, 62. The resulting capacitance change is detected by measurement and used to determine the degree of filling.

If the degree of filling measuring unit 12 is completely filled at the start of the discharge process, a calibration of the degree of filling measuring unit 12 can take place, whereby this can be updated according to plausibility criteria during the discharge.

Through its structure with a plurality of rectangular plates in the flow system, the degree of filling measuring unit 12 simultaneously acts as a flow straightener. The flow leaving the degree of filling measuring unit 12, which is generally approximately laminar, passes via the settling section 36 to the flow measuring unit 13, which comprises a measurement turbine.

The measurement results of the degree of filling measuring unit 12 and of the flow measuring unit 13 are fed to the controller 25, in the same way as the measurement results of the temperature sensor 20 and of the pressure sensor 22. In the evaluation unit 26 of said controller 25, the gas volume portion measured by the degree of filling measuring unit 12 is entered into a calculation continuously with the volume flow detected by the flow measuring unit 13. The actual product flow, adjusted with regard to the gas portions, through the measurement section 33 is thereby determined.

The fluid leaving the flow measuring unit 13 passes via the check valve 14 and the pipeline 15 into the distributor 16 and from there via the associated valve 45 into the full hose 42 selected by way of example.

If the tank is inadvertently or deliberately very extensively emptied during the discharge, a vortex can form and possibly gas pockets can arise, which may not be detected by the wetting sensor 21 under certain conditions. Such gas pockets are, however, established by the degree of filling measuring unit 12 and detected in relation to their volume portion. As soon as air penetration is detected by the degree of filling measuring unit 12, the conveyance speed can be reduced, for example by corresponding control of the pump 4, whereby the tendency for formation of suction decreases and thus the gas portion is reduced again. The corresponding control of the conveyance speed is thereby carried out via the control unit 27 of the controller 25.

In order to be able to react at an early stage to an air penetration, it can optionally be provided that a further degree of filling measuring unit is disposed in the inlet area of the pump 4, i.e. on the pipeline 3, wherein said further degree of filling measuring unit can be designed for a particularly high sensitivity in accordance with the degree of filling measuring unit 12.

Insofar as the tank 1 is constantly filled with the same, non-perishable product, it can be provided that the tank is never completely emptied during the discharge in normal operation, so that the line system and in particular the measurement line 30 generally remain filled. However, even in this case, it may be necessary, for example for cleaning purposes, to carry out a removal of the remains, i.e. a complete emptying of the line system with the measurement line 30. After removal of the remains, the measurement section 33 is empty and must be filled. It is then possible to proceed as follows:

At the start of the filling process the wetting sensor 21 reports the "empty" state, i.e. "air". The degree of filling measuring unit 12 likewise reports "empty", i.e. $\epsilon_r=1$. The vent line 9 is now unblocked by the vent valve 8. The bottom valve 2 is opened and the product flows through the effect of gravity or with the aid of the pump 4 into the measurement line 30. The air present in the measurement line 30 escapes via the vent line 9.

The degree of filling measuring unit 12 detects, during the filling, a partially filled pipe, of which the degree of filling continuously increases. If the degree of filling measuring unit 12 is completely full, in case of heating oil for example if the measured relative permittivity $\epsilon_r$ is approximately 3, it can thus be provided that the vent valve 8 arranged further up can henceforth be operated in cyclical operation, in order to avoid overflowing of the filling into the vent line 9.

As soon as the wetting sensor 21 responds and indicates wetting, the valve is closed. The system is then full and the measured discharge can be started.

The discharge and/or receiving of the fluid can be provided according to the invention so that the fluid generally has no gas portions. In particular stages of the discharge or receiving of fluid, in particular at the start and/or at the end of the discharge or receiving, for example if the chamber or the discharge tank is very extensively emptied, however, gas portions may arise at least at times. Gas portions may also be permanently contained in the fluid, in particular in case of tampering on the line system and/or if leakages arise, for example on a coupling or a line.

The invention includes all these described measurement situations. Insofar as in the context of the invention the situation thus relates to a fluid having a gas portion or a fluid having a gas portion at least at times, this case can include the fluid, in dependence upon the situation, permanently having a gas portion, sporadically having a gas portion and/or generally not having a gas portion at all.

The invention claimed is:

1. Device for detecting an amount of fluid flowing between two points and having a gas portion, comprising:
   a measurement line for conducting the fluid between the two points, the measurement line including:
      a flow measuring unit for measuring the rate of flow of the fluid in the measurement line,
      a degree of filling measuring unit for measuring the degree of filling in the measurement line, wherein the degree of filling measuring unit comprises an electrode arrangement for determining electrical properties of the fluid present in the measurement line, wherein the electrode arrangement has a plurality of electrode plates which form a plate stack and determine electrical properties that vary according to the gas portion of the fluid flowing through the plate stack,
   an evaluation unit in a signal connection with the degree of filling measuring unit and the flow measuring unit for determining the fluid amount conveyed through the measurement line based on the measurements made by the flow measuring unit and the degree of filling measuring unit,
   means for stopping the fluid flow in the measurement line at least at times, and
   means for determining a remaining fluid amount present in the measurement line downstream of the flow measuring unit and the degree of filling measuring unit based on the results of the measurements made by the flow measuring unit and the degree of filling measuring unit.

2. Method for detecting an amount of a fluid, having a gas portion at least at times, using the device according to claim 1, wherein the fluid is flowing in the measurement line, the method comprising the steps of:
   carrying out a degree of filling measurement in the measurement line by means of the degree of filling measuring unit,
   carrying out a flow measurement in the measurement line by means of the flow measuring unit, calculating the amount of fluid conveyed from the results of the flow measurement step and the results of the degree of filling measurement step, using the evaluation unit, intermittently stopping the fluid flow in the measurement line, and determining a remaining fluid amount present in the measurement line downstream of the flow measuring unit and the degree of filling measuring unit from the results of the flow measurement step and the results of the degree of filling measurement step, using the means for determining a remaining fluid amount.

3. Method according to claim 2,
wherein
at least one of the temperature, the pressure and the speed of the fluid in the measurement line is determined and the results are included in the step of calculating the amount of fluid conveyed.

4. Method according to claim 2, further comprising the steps of:
deducting the amount of remaining fluid, as determined in the step of determining a remaining fluid amount, from the amount of fluid conveyed, as calculated in the calculating the amount of fluid conveyed step and
adding the amount of remaining fluid, as determined in the step of determining a remaining fluid amount, to the amount of fluid conveyed, as calculated in the calculating the amount of fluid conveyed step, determined after resumption of the fluid flow.

5. Method according to claim 2, further comprising the step of:
recalibrating the degree of filling measuring unit with an ongoing degree of filling measurement.

6. Device according to claim 2, wherein the fluid is one of milk and fuel.

7. Device according to claim 1,
wherein
at least one of the electrode plates of the plate stack is arranged inside the measurement line,
at least two electrode plates of the plate stack extend parallel to each other,
the electrode plates of the plate stack are arranged equidistantly,
the electrode plates of the plate stack have at least approximately the same surface size and
the electrode plates of the plate stack are flat rectangular plates.

8. Device according to claim 1,
wherein
the electrode plates extend in the longitudinal direction of the measurement line, and
through channels for the fluid which extend in the longitudinal direction of the measurement line are formed between the electrode plates.

9. Device according to claim 1,
wherein
the measurement line has a rectangular inner cross-section, and
the outer cross-section of the plate stack corresponds at least approximately to the rectangular inner cross-section of the measurement line.

10. Device according to claim 1,
wherein
the electrode plates of the plate stack are electrically connected to form two groups of plates which form an interdigitated structure.

11. Device according to claim 1,
wherein
the degree of filling measuring unit is a capacitive measuring unit and
the electrode plates are electrically insulated in relation to the inside of the measurement line.

12. Device according to claim 1,
wherein
the flow measuring unit is a turbine flow meter.

13. Device according to claim 1,
further comprising a tank, wherein the tank is in fluid connection with the measurement line.

14. Device according to claim 1,
wherein
the measurement line is formed in a straight line, in the region of the flow measuring unit and the degree of filling measuring unit and
the measurement line extends at an angle to the horizontal, in the region of the flow measuring unit and the degree of filling measuring unit, and wherein the height of the measurement line decreases with increasing distance from the tank.

15. Device according to claim 1,
wherein
the flow measuring unit and the degree of filling measuring unit are arranged directly one behind the other in the course of the measurement line.

16. Device according to claim 1,
further comprising a control unit for controlling a flow through the measurement line in dependence upon the measured degree of filling.

17. Device according to claim 1,
further comprising a reducing unit provided in the measurement line for reducing gas pockets in the fluid before the fluid reaches the degree of filling measuring unit and the flow measuring unit.

18. Device according to claim 1, wherein the fluid is one of milk and fuel.

19. Device according to claim 17, wherein the reducing unit is one of a sieve and a filter.

* * * * *